United States Patent [19]

Kroon

[11] 3,909,932

[45] Oct. 7, 1975

[54] METHOD OF MANUFACTURING A MULTITRACK MAGNETIC HEAD

[75] Inventor: William L. Kroon, Sunnyvale, Calif.

[73] Assignee: Ampex Corporation, Redwood City, Calif.

[22] Filed: July 22, 1974

[21] Appl. No.: 490,309

Related U.S. Application Data

[60] Division of Ser. No. 409,045, Oct. 23, 1973, Pat. No. 3,843,968, which is a continuation of Ser. No. 156,801, June 25, 1971, abandoned.

[52] U.S. Cl. .................... 29/603; 360/121; 360/127

[51] Int. Cl.[2] .......................................... G11B 5/42

[58] Field of Search .................. 29/603; 346/74 ML; 360/121, 127

[56] References Cited

UNITED STATES PATENTS

| | | | |
|---|---|---|---|
| 3,064,333 | 11/1962 | Kristiansen et al. | 29/603 |
| 3,145,452 | 8/1964 | Camras | 29/603 |
| 3,404,242 | 10/1968 | Girdner | 29/603 X |
| 3,529,349 | 9/1970 | Van De Schoot et al. | 29/603 |
| 3,789,505 | 2/1974 | Huntt | 29/603 |
| 3,807,042 | 4/1974 | Braitberg | 29/603 |

*Primary Examiner*—Carl E. Hall

[57] ABSTRACT

A multitrack magnetic head asembly is described in which magnetic ferrite pole tips are held in place at the transducing face of the assembly by a ceramic material to which the ferrite pole pieces are glass bonded. This face part is in turn secured to a core housing carrying a plurality of core members and coil means disposed to complete the magnetic circuit through the ferrite pole pieces. As magnetic ferrite materials have many characteristics similar to the ceramic material, the face part composed of these two substances becomes a structure of high physical integrity capable of lasting under the abusive conditions of high magnetic tape speeds. Also, a method of constructing this head assembly is provided in which the ceramic face part is comprised of two half portions each carrying a set of ferrite pole pieces glass bonded therein such that the ceramic half portions can be assembled with a layer of nonmagnetic material disposed therebetween to form the transducing gaps between each associated pair of ferrite pole pieces. Once the face part portions are assembled and secured, this sub-assembly is mounted on the core housing, also of ceramic material, in such a way that the core members are arranged in the core housing to engage the ferrite pole pieces.

9 Claims, 26 Drawing Figures

METHOD OF MANUFACTURING A MULTITRACK MAGNETIC HEAD

This is a division of application Ser. No. 409,045 filed Oct. 23, 1973 now U.S. Pat. No. 3,843,968, which was itself a continuation of a then copending application Ser. No. 156,801, filed June 25, 1971, now abandoned.

In general, the present invention relates to magnetic transducers and more particularly to a multitrack head assembly employing transducer components of magnetic ferrite material and to a method of constructing such a head assembly.

Most all multitrack magnetic heads in use today are formed with magnetic transducer poles of metallic material. In certain applications, metals such as Alfenol, Silconol, and Alfesil are preferred due to their relatively high permeability and physical hardness, while other applications call for the softer but higher permeability of laminated permalloy or numetal transducer parts. Heads constructed of any of these materials are subject to abbreviated lives due to the abrasive wearing effect of tape, particularly in high performance instrumentation and digital transports where tape speeds range from 50 to 120 inches per second. It was early thought that the solution to the lack of a durable material having good magnetic properties could be found in the use of magnetic ferrites. Ferrites are characteristically very hard and exhibit an adequate permeability at low frequencies and a very desirable high frequency permeability. Unfortunately, by reason of the extreme hardness of ferrites, this material is also very brittle and a poor thermal conductor rendering it troublesome to maintain a good definition of the nonmagnetic gap which is found between two ferrite pole pieces. Also, many practical difficulties are encountered in constructing a magnetic head of this material having mechanically desirable characteristics. These latter problems concern the workability and the internal strength of ferrites and are particularly significant in the construction of high performance instrumentation and digital recorders wherein the tracking azimuth and gap scatter of the multitrack head must be held to extremely fine tolerances. For example, it might be thought a simple matter to mount the ferrite pole pieces in an open face housing and secure the transducer arrangement in place by potting with an epoxy. This type of construction, however, has been found unsatisfactory due to the considerable heat developed at the head face due to the abrasive effects of the moving tape and/or environmental conditions which cause the epoxy material to creep or otherwise release the transducer components from their original positions giving rise to non-zero track azimuth and gap scatter. It is noted that the difficulty with using a potting or epoxy compound at the head face has also been demonstrated when using nonferrite metal transducers. In fact, in the case of transducers formed of metallic Alfenol or Silconol type materials, the industry has resorted to a head structure consisting of a metal face where the active magnetic pole pieces are surrounded, except for microscopic gaps, by a uniform metal surface against which the tape bears. Such a metal housing rigidly maintains the metal pole pieces in the desired orientation. Such all metal heads have in fact been the most successful high performance magnetic heads at this time.

Accordingly, it is an object of the present invention to provide not only an improved long life high performance multichannel magnetic head but also to provide a method for constructing such a head adapted to large scale production.

These and other objects, features and advantages of the invention will become apparent from the following description and accompanying drawings describing and illustrating the preferred embodiment of the invention, wherein.

Figure 1:
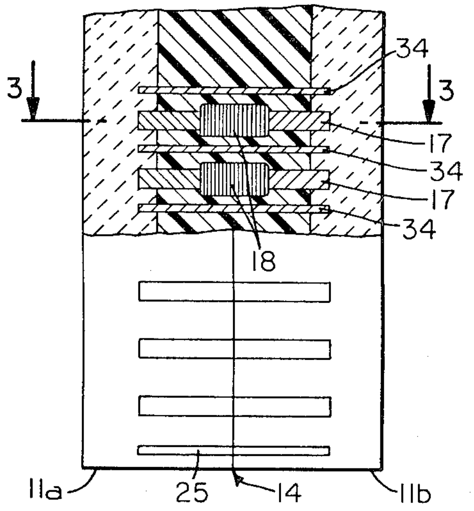
FIG. 1 is a front elevation view of the magnetic head assembly partially cut away for clarity.
Figure 2:
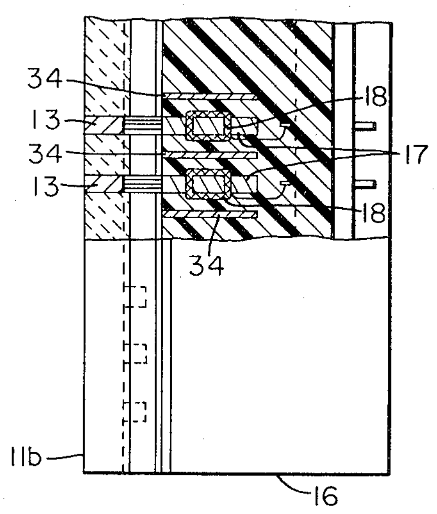
FIG. 2 is a side elevation view also partially cut away to display the internal components.

With reference to FIGS. 1–4, the magnetic head assembly of the present invention comprises a head face part 11 of a ceramic material in which a plurality of separate magnetic pole pieces 12 and 13 are inserted. In accordance with the invention, each of the plurality of pole pieces 12 and 13 are of a magnetic ferrite material and are glass bonded to the surfaces of part 11 in contact therewith. According to the method of the present invention, face part 11 is in face formed in two half portions 11*a* and 11*b*, each carrying a half set of the pole pieces such that in the completed head assembly, part portions 11*a* and 11*b* and the plurality of pole tips 12 and 13 abut at a gap region 14 in which a layer of nonmagnetic material is disposed to define the transducing gaps. Face part 11 with the various pole pieces 12 and 13 mounted therein is fabricated as a unit and is thereupon mounted onto a core housing 16, preferably also of a ceramic material, carrying a plurality of magnetic core members 17, each provided with an electrical coil 18. Each core member 17 is arranged to engage associated pairs of pole pieces 12 and 13 of face part 11 so as to complete a magnetic circuit in each case traversing the nonmagnetic transducing gap at region 14. Thus, separate branches 21 and 22 of each core member 17 are positioned so as to engage associated pole pieces 12 and 13 on opposite sides of the nonmagnetic gap. In this manner, a plurality of transducers are formed, each comprising a pair of pole pieces carried in front face 11 and a single integral core member mounted within housing 16.

A principal feature of the present invention resides in the ceramic composition of face part 11 in combination with the ferrite pole pieces 12 and 13. As the ceramic material exhibits extreme hardness, similar to the magnetic ferrite material, it provides an extremely low rate of wear when subjected to the abrasive effects of magnetic tape driven at high speeds. Furthermore, unlike magnetic heads formed with an epoxy or plastic face, the ceramic face part firmly retains the ferrite pole pieces against any physical displacement, even under operating conditions where the head is subjected to substantial heat, thereby assuring negligible individual track azimuth and gap scatter. A further advantage realized by this construction, is that the ceramic material may be selected to have a coefficient of thermal expansion within the same range as the magnetic ferrite material used for the pole pieces 12 and 13. Under operating conditions, the face portion of the head assembly may be subjected to a wide range of temperatures such as caused by the frictional effects of the moving tape or environmental conditions. However, as the expansion and contraction of face part 11 and that of the ferrite pole pieces are substantially the same, there is minimal stress placed on the ferrite parts and the critical gap region therebetween, thereby giving further stability to the physical integrity of the structure. Additionally, the glass seals formed at the face part prevent absorption of moisture into the assembly which might otherwise cause damage.

As described more fully herein, in the preferred method of constructing this head assembly, each of the ferrite pole pieces 12 and 13 are glass bonded to the surrounding ceramic material of face part 11. The glass material employed as a flux for this purpose, is like the ceramic material comprising face part 11, selected to have a coefficient of thermal expansion within the same range as that of the magnetic ferrite material. Thus, the entire face part sub-assembly is formed into a durable ceramic-glass-ferrite unit, providing an extremely hard surface capable of being polished to a high degree so as to afford the least possible friction to the magnetic tape.

Figure 3:
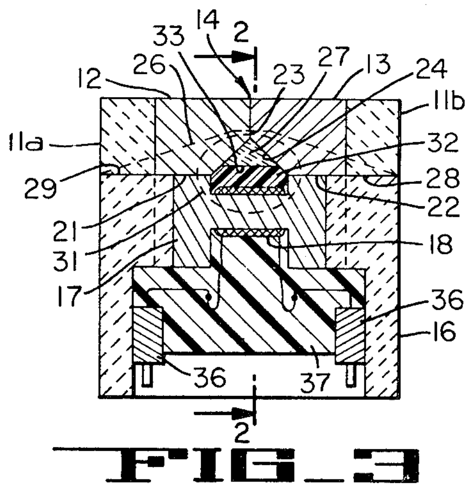
FIG. 3 is a section view of the head assembly of FIG. 1 taken along lines 3—3 thereof.
Figure 4:
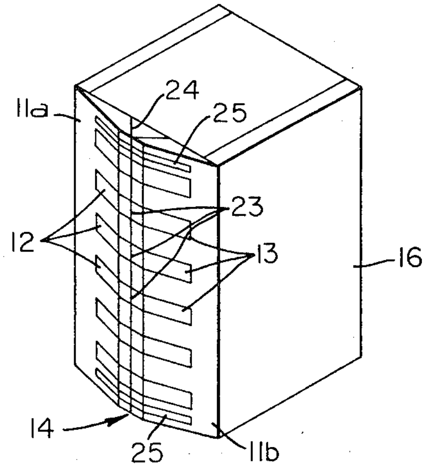
FIG. 4 is a perspective view of the magnetic head assembly.

In order to define the depth (vertical direction in FIG. 3) of transducing gaps 23 when the head is finished, face part 11 and pole pieces 12 and 13 are provided with a V-shaped groove 24 extending parallel and beneath gap region 14 with the groove apex defining the bottom of nonmagnetic gap 23 between each pair of pole pieces. Face part 11 with each of the plurality of pole pieces 12 and 13 are as a unitary structure contoured from the rectangular configuration shown in FIG. 3 to a configuration shown by dotted line 26 such that the head assembly appears as in FIG. 4 in its final form. The top of each of nonmagnetic gap 23 is thus located as shown in FIG. 3 at the intersection of dotted line 26 and the line defining gap region 14. As the depth of gap 23 can be extremely small, on the order of one-half to several mils, the face assembly is provided with a wedge shaped reinforcing member 27 of ceramic material mounted as best illustrated in FIG. 3 in mated disposition within V-shaped groove 24. As described more fully hereinafter, member 27 may be neither epoxied or glass bonded to the interior walls of groove 24.

Portions of 11*a* and 11*b* of the face part are held in an assembled condition prior to mounting on core housing 16 by means of a pair of ceramic or ferrite tie-bars 25. Each tie-bar is a single integral member mounted and epoxy bonded within face part 11 extend between and secure together portions 11a and 11b. The material for tie-bars 25, either ceramic or ferrite, is selected to have physical properties similar or identical to ceramic face part 11 so as to again eliminate undesirable stress conditions due to differential thermal expansion of the various components.

A planar surface 28 of face part 11 is mounted on a corresponding planar surface 29 of core housing 16 such that the faces of pole pieces 12 and 13 flush with surface 28 engage surface portions of one of core members 17 flush with surface 29 completing a magnetic circuit (as indicated by dotted line 31) traversing gap 23. In order to secure part 11 to housing 16, an epoxy bond 32 is provided between the otherwise exposed face 33 of wedge member 27 and a previously potted region of surface 29 of the core housing. For this purpose, it is noted that member 27 is dimensioned so that lower face 33 is recessed in V-groove 24 relative to planar surface 28.

It has been found that for certain high frequency applications adequate interchannel shielding can be provided by arranging a plurality of shields 34, in this instance of laminated soft magnetic metal such as nu-metal, between each adjacent pair of core members 17 as illustrated where such shields extend generally flush with surface 29 of housing 16. While shields 34 are thus carried wholly within core housing 16 and do not extend into face part 11, shielding has been found sufficient as interchannel coupling, particularly at higher frequencies, is most critical in the regions surrounding the coils of core members 17. In other transducer applications, it is necessary to extend the shielding into face part 11 as illustrated in the embodiment of FIGS. 6A–6J.

Core members 17 with coils 18 mounted thereon and shields 34 are secured in place along with a pair of connector strips 36 by a thin film of adhesive material between the strips and the side walls of the housing. In the preferred head assembly, core housing 16 is formed of a material having a coefficient of thermal expansion in the same range as that of face part 11, and is in this instance of the identical ceramic material as the face part.

Figure 5A:
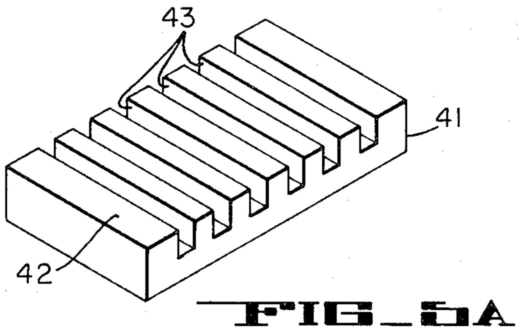
FIGS. 5A through 5L illustrate the various steps involved in the method of constructing the magnetic head assembly in accordance with the present invention.
Figure 5B:
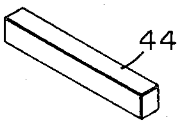
Figures 5C, 5D, 5E, 5F, 5G, 5H, 5I, 5J, 5K, 5L:
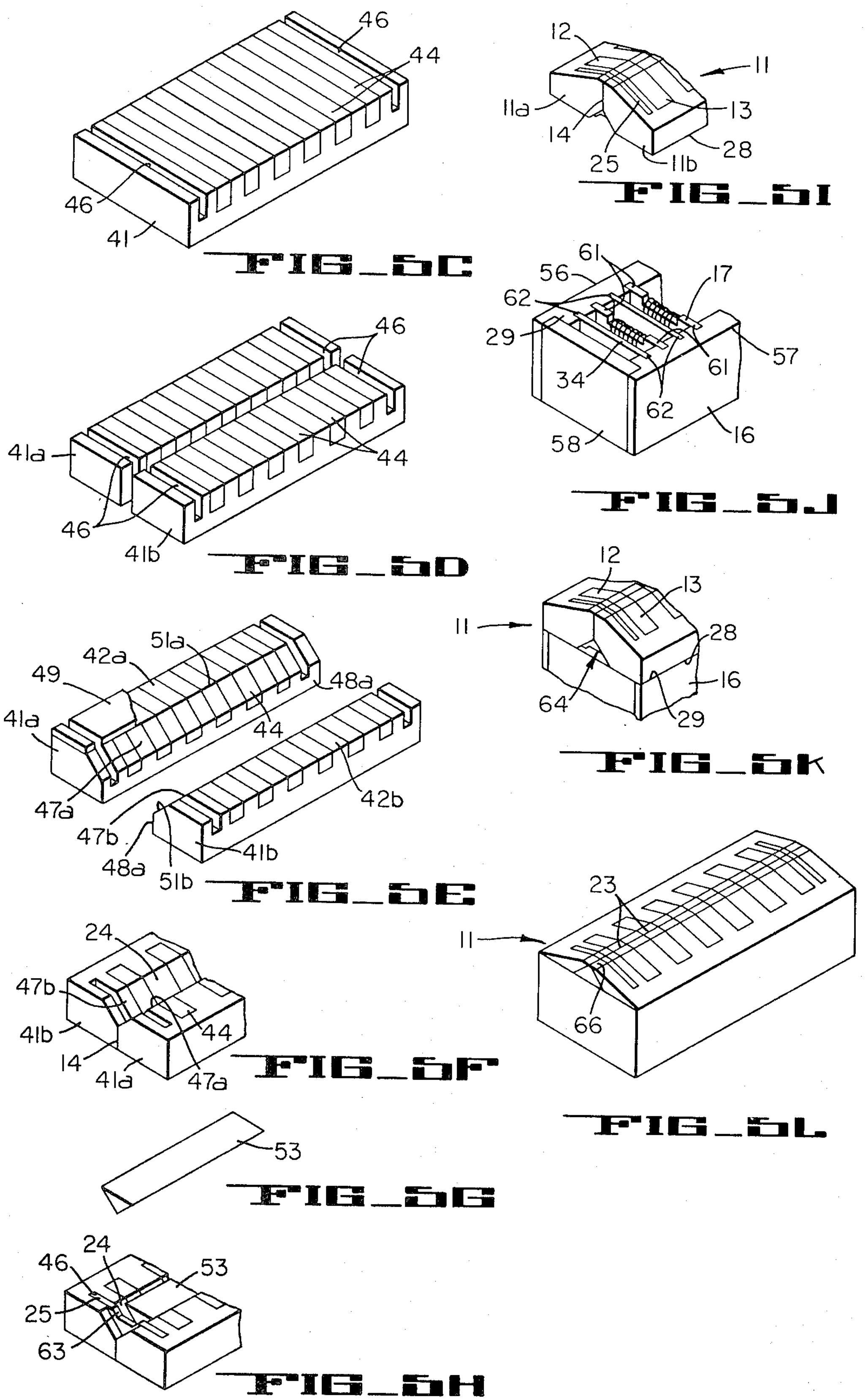

In accordance with the method of the present invention illustrated in FIGS. 5A–5L, face part 11 is formed from a rectangular block 41 of ceramic material in which a planar face 42 thereof is provided with a plurality of spaced, parallel, rectangular cross section slots 43. Slots 43 and other machining operations performed on the ceramic and ferrite materials are carried out using diamond cutters. Thereupon, a plurality of elongate rectangular magnetic ferrite slugs or pieces, such as ferrite piece 44 of FIG. 5B, are formed for mated insertion into each of slots 43 as best shown by FIG. 5C. Moreover, each of ferrite pieces 44 is glass bonded to the walls of slots 43. This glass bonding operation can be effected in accordance with well known techniques and materials. The process used in this instance provides for initially disposing ferrite pieces 44 within slotted block 41 with the various parts dimensioned so as to leave a slight spacing between the exterior of the ferrite pieces and the interior walls of slots 43. Thereupon, powdered glass is piled on top of face 42 and the entire assembly is heated at 675° C for one hour (such that this glass melt flows by gravity and capillary attraction into the wall interspaces) and cooled down at a maximum rate of 1.5° C per minute. The glass material used in this process is commercially available as Corning Glass No. 7570. It has been found that a preferred ceramic material for block 41 may be obtained from Minnesota Mining and Manufacturing Company or G.E. under the generic name - Forsterite, a material having the composition $2MgO.SiO_2$. Preferably, the magnetic pieces 44 are formed from a hot pressed ferrite, discussed more fully herein, and the ceramic Forsterite, the glass used for bonding, and the ferrite are all selected to have coefficients of thermal expansion within the same range, i.e., within 20% of one another.

Having mounted the various ferrite pieces within block 41, face 42 is lapped planar and precisely square with the remaining sides of the block. Also at this time, block 41 is formed with tie-bar slots 46 which will later serve with tie-bars 25 to secure the two half block portions together. Slots 46 are preferably disposed parallel to pieces 44 and adjacent opposite ends of the block. The block assembly is now cut at least once along a plane normal to face 42 as best illustrated in FIG. 5D and at right angles to ferrite pieces 44 so as to form a plurality of severed block portions, in this instance consisting of two equal half portions 41a and 41b. By starting with a single block 41 of ceramic material and cutting it into a plurality of portions, the ferrite pole pieces are assured of proper lateral registration in the ultimate head assembly.

With reference now to FIG. 5E, each block portion 41*a* and 41*b* is provided with bevelled faces 47*a* and 47*b*. In particular, faces 47*a* and 47*b* are cut at approximately 45° along a longitudinal edge of the severed block portions intercepting each ferrite piece 44 as illustrated to leave strip portions of orginal planar face 42 as surfaces 42*a* and 42*b*. The half blocks are now lapped along faces 47*a* and 47*b*, surfaces 42*a* and 42*b*, and surfaces 48*a* and 48*b* to insure proper alignment of the ferrite pole pieces carried by portions 41*a* and 41*b* when they are mounted together as described herein.

Having completed these steps, one or both of surfaces 42*a* and 42*b* of the half block portions are disposed to receive a deposited layer of nonmagnetic gap forming material, such as layer 49. As described herein, surfaces 42*a* and 42*b* are eventually arranged to abut at layer 49 and thus define nonmagnetic gap region 14. Gap forming layer 49 may be provided by a number of known processes and materials, such as by metal or glass shim, vacuum evaporation or sputtering processes. In this instance, it has been found that a preferred gap definition may be obtained by sputtering a layer of Aluminum Oxide ($Al_2O_3$) to a desired thickness onto one or both of surfaces 42*a* and 42*b*. The sputtering operation, due to its high energy characteristics, has been found to form an exceedingly cohesive layer, both internally of the layer material itself and in terms of its adhesion to the ferrite and ceramic surfaces. Typically, the nonmagnetic gap may have a length (corresponding to the thickness of layer 49) ranging from 1 or 2 $\mu$ inches on up to 150 $\mu$ inches.

At this point, half block portions 41*a* and 41*b* are each rotated by 90° about their longitudinal axes, such that faces 42*a* and 42*b* meet in registration separated only by layer 49. In this manner, the surfaces of ferrite pieces 44 exposed at faces 42*a* and 42*b* form the pole faces of the magnetic transducer in abuttment at nonmagnetic gap region 14. The assembly of these two half block portions is best shown in FIG. 5F where the parts after assembly have been turned up-side-down. Bevelled faces 47*a* and 47*b* form, as shown in FIG. 5F, the V-shaped groove 24 discussed above in connection with FIG. 3. The assembly procedure should be such that gap region 14 along the apex of groove 24 is precisely defined which in turn requires that the boundary edges 51*a* and 51*b* between face 47*a* and 47*b* and face 42*a* and between face 47*b* and face 42*b* respectively are substantially coextensive. This criterion is important in view of a later step in which most of the face part material defining gap region 14 is cut away, as shown in FIG. 3, leaving only a small amount of material to define gaps 23. If the block portions are not precisely positioned with respect to each other for the entire length thereof, then it will be impossible to attain a uniform depth for gap 23 for all of the pole pieces 12 and 13.

Block portions 41*a* and 41*b* are secured together in their assembled relation by the pair of tie-bars mounted within the tie-bar slots, such as shown by tie-bar 25 within slot 46, retaining the block halves at opposite ends thereof. In addition, the assembly is strengthened, particularly at gap region 14, by a wedge shaped reinforcing member 53, shown in FIG. 5G, which is shaped and dimensioned to fit in mated recessed disposition within V-groove 24 of the assembly. In this instance, wedge member 53 is of the same Forsterite ceramic material as block 41 while tie-bars 25 in this instance are of the same ferrite material as pieces 44. However, member 53 may be provided from a nonmagnetic ferrite material and tie-bars 25 may be formed from a ceramic material such as Forsterite. In any event, the material chosen for these parts should have a coefficient of thermal expansion within the same range, i.e., within 20%, as that of the block 41 material and the ferrite material used for pieces 44. For the present embodiment, wedge member 53 and tie-bars 25 are epoxied into place, using a suitable epoxy such as Able Stick 410-3, available from Able Stick Laboratories, Inc. It is anticipated, however, that these parts may be glass bonded in place by using a two step glass bonding operation whereby a first glass material having a relatively high melting temperature is employed for bonding ferrite pieces 44 into place and thereafter a second glass material having a lower melting temperature is provided for securing wedge 53 and tie-bars 25. While it is noted that an epoxy is suitable for securing member 53 and bars 25 in place, it is not satisfactory for the pole pieces 12 and 13 which require the high temperature strength, stability and hardness afforded by the glass bond.

The assembly resulting from these method steps, after precontouring, is illustrated in FIG. 5I and will henceforth be identified in accordance with FIGS. 1–4, as face part 11 consisting of two half portions 11*a* and 11*b*. Similarly, ferrite pieces 44 have now become pole pieces 12 and 13 as referred to above.

With reference to FIG. 5J, core housing 16 is formed from a set of two side pieces 56 and 57, preferably of the same ceramic material used for block 41, and a pair of end members, one of which is shown as member 58, wherein the side pieces are secured to the end members by epoxy bonding. Prior to assembling core housing 16, side pieces 56 and 57 are each formed with a plurality of slots 61 and 62 for core members 17 and shields 34 respectively. After such assembly, core members 17 and shields 34 are inserted in place and the part of the housing adjacent surface 29 is potted with a suitable compound such as again Able Stick 410-3 and thereafter the portion of the housing carrying connectors 36 is potted, in this latter case using a rubbery potting compound RTV (No. 8111 and curing agent NUO-CURE 28 available from General Electric).

In the presently described and preferred embodiment and as mentioned above, shields 34 do not extend into face part 11 and thus after shielding only in the region of coils 18 carried by core members 17. This has been found adequate where high frequency use is intended and the low frequency specifications are not too stringent. As the shields in this instance do not appear at the face of face part 11, it is possible to use laminated soft magnetic metals such as permalloy or mumetal for these parts. An alternative preferred embodiment in which shields are disposed in the face part is shown in FIGS. 6A–6J.

As mentioned above, core members 17 are preferably of a ferrite material because of the preferred low loss characteristics thereof, particularly at high frequencies.

After lapping surface 29 of housing 16 and surface 28 of face part 11, the latter is mounted onto the housing as shown in FIG. 5K with the various pole pieces 12 and 13 of face part 11 in registration with core members 17. For the head assembly to operate successfully, it is important that the surfaces of pole pieces 12 and 13 exposed at planar surface 28 be in substantial contact with the pole surfaces associated with branches 21 and 22 of core members 17 at surface 29 of the core housing. For this reason, the lapping of surfaces 28 and 29 should be carried out to within two light bands or approximately 20 microinches flatness.

With face part 11 arranged as shown in FIG. 5K on top of housing 16, the two parts of the head assembly are secured together by an epoxy bond 32 as mentioned in connection with FIG. 3. A suitable epoxy is again Able Stick 410-3. In particular, the epoxy material is pressed into an open space region defined on the one hand by V-groove 24 and wedge member 53 of face part 11 and on the other hand by surface 29 of housing 16. This free space is best illustrated in FIG. 5H. In order to provide access to the opening from either end of the head assembly, each of tie-bars 25 is formed with a notched-out portion 63 best illustrated in FIG. 5H so that the liquid epoxy material can be forced under pressure into this region from one end of the assembly as indicated by arrow 64 in FIG. 5K. Suitable pressure is applied until the epoxy flows out the opposite end of the window, insuring complete filling of the space. After curing, face part 11 is thus bonded to the core housing by only a strip of epoxy material underlying groove 24 and member 27. As described and claimed in a U.S. application for Pat. Ser. No. 156,802, now U.S. Pat. No. 3,761,641 entitled MAGNETIC HEAD with demountable face part assembly (ID), filed on June 25, 1971 by Tony Antoon Milnaric, this feature has the advantage of permitting subsequent removal of face part 11, should it prove initially defective or thereafter become defective in operation, merely by grinding away the face part until surface 29 of core housing 16 is reached. Thereupon surface 29 may be relapped and a new face part 11 installed.

In FIG. 5L, the final head assembly is shown in which face part 11 has been contoured to provide a flat region or radius depending upon the desired shape at the head-to-tape interface 66 with the remaining portions of the front surface of face part 11 sloping away from region 66. The contour for the head assembly in its final form is best shown in FIG. 3 by dotted line 26. A typical depth dimension for gaps 23 after final contouring is 1–3 thousandths of an inch.

While it has been stated that the material for pole pieces 12 and 13 is a magnetic ferrite, the best results have been obtained with a ferrite material processed in particular fashion, namely by hot pressing. While other ferrites such as those grown from a single crystal are satisfactory for some lower performance equipment, the hot pressed ferrites, due to their greatest internal strength coupled with a high density (low porosity), offer the more desirable characteristics for a high performance transducer assembly. In general, hot pressed ferrites are formed by starting with a granular form of Maganese or Nickel ferrite material and compressing and molding the starting substance under high pressure and temperature. The fine grain although like all ferrites somewhat brittle, it can be cut into the shape of ferrite pieces 44 and bonded in slotted block 41 as described above for forming pole pieces 12 and 13.

Figures 6A, 6B, 6C, 6D, 6E, 6F, 6G, 6H, 6I, 6J:
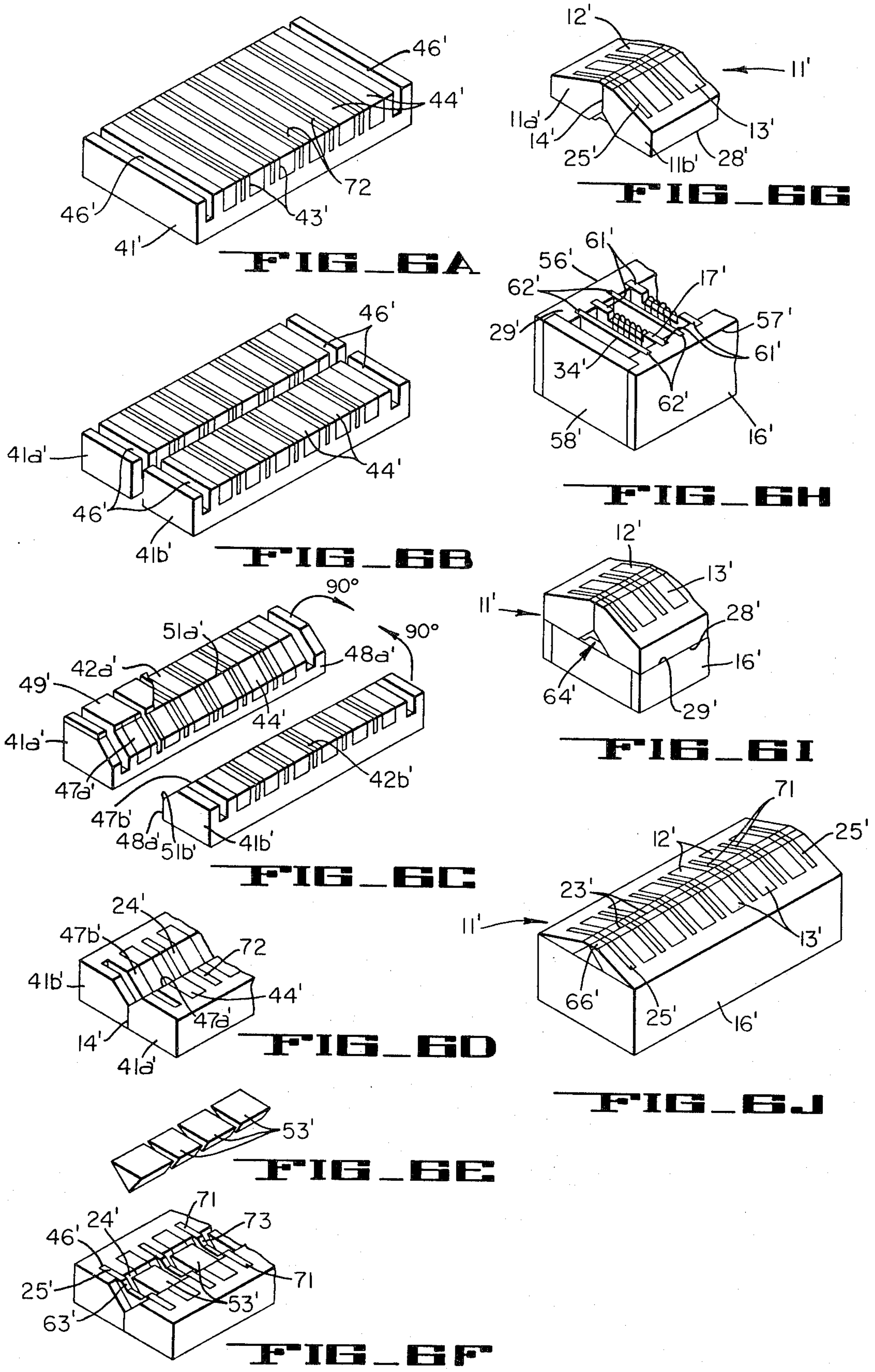
FIGS. 6A through 6J illustrate the various steps for constructing an alternative preferred embodiment of the head assembly in accordance with the invention.

With reference to FIGS. 6A–6J, an alternative preferred embodiment of the invention is shown in which the face part is provided with magnetic ferrite shields separating each set of pole pieces. For simplification, FIGS. 6A–6J use the reference numerals of corresponding parts of FIGS. 1–5 with a prime added. Thus, FIG. 6J illustrating the alternative embodiment of the invention in final form, shows a head assembly with a face part 11′ carrying a plurality of pole pieces 12′ and 13′ forming the plurality of magnetic tracks. Interspaced between these tracks is a plurality of magnetic ferrite shield parts 71. While the previous embodiment of the invention is suitable for applications in which the low frequency cross talk specifications are not critical, other applications require intertrack shielding in the face part itself where the shields extend to the head-to-tape interface. In providing for such shields in accordance with the present invention, the initial process steps are the same as described above in connection with FIGS. 5A and 5B.

In FIG. 6A, ceramic block 41′ is formed with a plurality of shield slots 72, similar to tie-bar slots 46′ but arranged in between each pair of adjacent ferrite pieces 44′ as illustrated. As in the case of the embodiment of FIG. 5D, block 41′ is now cut into at least two portions **41*a*′ and 41*b*′ as shown in FIG. 6B, and the block portions are processed as described above in connection with FIG. 5E with the result of these steps being illustrated by FIG. 6C. The block portions 41*a*′ and 41*b*′ are now rotated and arranged as shown in FIG. 6D so that shield slots 72 and tie-bar slots 46′** are oriented to receive the respective shield and tie-bar parts.

In FIG. 6F, shield parts 71, which are of a magnetic ferrite material, are mounted within the provided slots 72 while at the same time tie-bars 25′ are installed within slots 46′. In contrast to the integral wedge shaped member 53 for the above described assembly, member 53′ in this instance is sliced into a plurality of segments as shown in FIG. 6E, with each segment being dimensioned so as to fit in the space between adjacent shield parts 71 or a shield part and one of tie-bars 25′. Thereupon, shield parts 71, tie-bars 25′ and wedge segments 53′ are epoxy bonded into place. As an alternative procedure, a two temperature glass bonding process may be employed with the higher temperature glass used for bonding the ferrite pieces 44′ in place and the lower temperature glass employed for bonding the shield parts, tie-bars and wedge segments.

The portions of shield parts 71 lying within V-shaped groove 24′ are formed with notches 73′ similar to notches 63′ so as to permit the flow of epoxy in the V-groove region for bonding face part 11′ to housing 16′ as described herein in connection with FIG. 61. Face part 11′ is now completed by precontouring the head face, the result of which is shown in FIG. 6G, and lapping surface 28' for mating with the surface 29' of core housing 16'.

In FIG. 6H, core housing 16' is fabricated in the same manner as described for the previous embodiment. As in the head assembly of FIGS. 1–5, shields 34' may be formed of either a magnetic ferrite material or of a laminated soft magnetic metal, such as mumetal. In this instance, the fabrication process should insure that shields 34' are flush with lapped surface 29' of the core housing, not recessed, so as to meet with and engage shield parts 71 of the face part in a manner similar to the engagement of pole tips 12' and 13' with magnetic cores 17'. In this manner, when face part 11' is mounted and secured to the core housing as shown in FIG. 6I, shield parts 71 are magnetically integral with corresponding shields 34' in housing 16'.

Face part 11' is bonded to housing 16' in the same manner as described for the previous embodiment, by forcing a liquid epoxy into the window space defined by V-groove 24' and core housing surface 29' as indicated by arrow 64' in FIG. 6I. The completed head is shown by FIG. 6J after suitable contouring of the face.

What is claimed is:

1. A method of constructing a magnetic head assembly comprising the steps of, forming a plurality of slots in a block of ceramic material, glass bonding a plurality of pieces of magnetic ferrite material in said slots, cutting said block along a plane intercepting said ferrite pieces to form at least two severed block portions each carrying portions of said ferrite pieces, securing said block portions together to form a face part for said head assembly with respective ones of said ferrite pieces of each block portion aligned and a layer of nonmagnetic gap forming material disposed therebetween such that a face part having a plurality of spaced magnetic head pole tips is formed, and mounting said face part onto a core housing carrying a plurality of core members and coil means with said core members each arranged to engage associated ferrite pieces of said face part to complete magnetic circuits traversing the nonmagnetic gaps therebetween.

2. The method of claim 1 wherein said block is generally rectangular and said slots are parallel across one of the planar faces thereof and said cutting plane extends normal to said planar face and normal to said slots, the further steps comprising, forming a bevel along one edge of each of said block portions together with said planar faces, said bevelled edges defining a V-shaped groove, the face part formed by said secured block portions being mounted with said V-shaped groove confronting said core housing and said core members having spaced apart pole portions engaging said ferrite pieces on opposite sides of said groove.

3. The method defined in claim 2 further comprising the steps of, disposing a wedge shaped ceramic member in mated engagement and recessed within the V-shaped groove of said face part, bonding said wedge member to said ceramic block portions and ferrite pieces prior to mounting on said core housing, and securing said block portions to said core housing by applying epoxy adhesive in a window space formed between said recessed V-shaped groove and said core housing.

4. The method as defined in claim 2 further comprising the steps of, forming a tie-bar slot at each end of said block parallel to said ferrite pieces prior to cutting said block into said severed portions, and with said block portions arranged in assembled relation disposing and bonding a tie-bar of ceramic or ferrite material in each said tie-bar slot to bridge and secure said block portions together as said face part.

5. The method of claim 1 further defined by selecting said ceramic material and ferrite material and the material for forming said glass bond to have coefficients of thermal expansion within the same range.

6. The method of claim 1 further defined by said nonmagnetic material layer provided by a particle sputtering process.

7. The method of claim 1, further defined by said core housing being formed of a ceramic material and said core members being formed of a magnetic ferrite material and comprising the further steps of, mounting said core members in said ceramic core housing, epoxying said core members in place and curing, lapping the surface of said core housing and exposed pole portions of said core members for receiving said face part, and lapping the mating surface of said face part before mounting onto said core housing.

8. The method of claim 7, further comprising the steps of mounting a plurality of shield parts in said face part by forming a shield part slot between each pair of adjacent ferrite pieces bonded in said block and mounting and bonding a shield part of magnetic ferrite material in each set of registering shield part slots when said block portions are in assembled relation, mounting a plurality of intercore magnetic shields along with and in between said core members in said housing, said shield parts carried by said face part arranged to engage corresponding shields carried by said core housing when said face part is mounted on and secured to the core housing.

9. A method of constructing a magnetic head assembly comprising the steps of, forming at least two block portions of ceramic material each having a plurality of slots carrying a corresponding plurality of pieces of magnetic ferrite material glass bonded therein, forming a planar surface on each block portion with portions of said ferrite pieces flush therewith, securing said block portions together to form a face part for said head assembly with said planar surface portions confronting and respective ones of said ferrite pieces of each block portion aligned and with a gap forming nonmagnetic material therebetween such that a face part having a plurality of spaced magnetic head pole tips is formed, mounting said face part onto a core housing carrying a plurality of core members and coil means with each core member arranged to engage associated ferrite pieces to complete a magnetic circuit traversing the nonmagnetic gap therebetween, contouring said face part such that said ferrite pieces and nonmagnetic gaps therebetween are exposed for transducing with respect to a magnetic storage medium.

* * * * *

65